(12) United States Patent
Minagata et al.

(10) Patent No.: US 10,756,379 B2
(45) Date of Patent: Aug. 25, 2020

(54) POWER STORAGE MODULE

(71) Applicant: KABUSHIKI KAISHA TOYOTA JIDOSHOKKI, Kariya-shi, Aichi-ken (JP)

(72) Inventors: Atsushi Minagata, Aichi-ken (JP); Satoshi Kono, Aichi-ken (JP); Kojiro Tamaru, Aichi-ken (JP); Satoshi Hamaoka, Aichi-ken (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 0 days.

(21) Appl. No.: 16/471,039

(22) PCT Filed: Nov. 21, 2017

(86) PCT No.: PCT/JP2017/041846
§ 371 (c)(1),
(2) Date: Jun. 19, 2019

(87) PCT Pub. No.: WO2018/116729
PCT Pub. Date: Jun. 28, 2018

(65) Prior Publication Data
US 2019/0334195 A1 Oct. 31, 2019

(30) Foreign Application Priority Data

Dec. 20, 2016 (JP) .................................. 2016-246298
Feb. 14, 2017 (JP) .................................. 2017-025309

(51) Int. Cl.
*H01M 10/04* (2006.01)
*H01G 11/26* (2013.01)
(Continued)

(52) U.S. Cl.
CPC ........ *H01M 10/0418* (2013.01); *H01G 11/26* (2013.01); *H01G 11/52* (2013.01);
(Continued)

(58) Field of Classification Search
CPC .................................................. H01M 10/0418
See application file for complete search history.

(56) References Cited

U.S. PATENT DOCUMENTS 6,436,577 B1* 8/2002 Kida ..................... H01M 4/525
429/218.1
2004/0067417 A1* 4/2004 Oosawa .................. H01M 2/26
429/210
(Continued)

FOREIGN PATENT DOCUMENTS

JP 2005-259379 A 9/2005
JP 2006-086049 A 3/2006
(Continued)

OTHER PUBLICATIONS

U.S. Appl. No. 16/471,039 (Year: 2020).*
(Continued)

*Primary Examiner* — Brian R Ohara
(74) *Attorney, Agent, or Firm* — Sughrue Mion, PLLC

(57) ABSTRACT

A power storage module includes a cylindrical resin portion that extends in a direction in which a plurality of bipolar electrodes is stacked and that accommodates therein the plurality of the bipolar electrodes. The resin portion includes a first seal portion that has a cylindrical shape and is joined to peripheral edge portions of a plurality of electrode plate, and a second seal portion that has a cylindrical shape and is disposed outside the first seal portion in a direction that crosses the stacking direction of the bipolar electrodes. A plurality of separators is disposed such that outer peripheral ends of the separators are located between an outer peripheral end of the first seal portion and an inner peripheral end of the first seal portion.

7 Claims, 11 Drawing Sheets

(51) Int. Cl.
    *H01G 11/52*     (2013.01)
    *H01G 11/80*     (2013.01)
    *H01M 2/02*     (2006.01)
    *H01M 4/02*     (2006.01)

(52) U.S. Cl.
    CPC .......... *H01G 11/80* (2013.01); *H01M 2/0262* (2013.01); *H01M 2004/029* (2013.01); *H01M 2220/20* (2013.01)

(56) References Cited

U.S. PATENT DOCUMENTS

2013/0202926 A1\*   8/2013   Yoon .................. H01M 2/1022
                                                                       429/82
2014/0349147 A1   11/2014   Shaffer, II et al.

FOREIGN PATENT DOCUMENTS

| JP | 2007-257859 A | 10/2007 |
|----|---------------|---------|
| JP | 2008-140633 A | 6/2008 |
| JP | 2010-277907 A | 12/2010 |
| JP | 2011-233298 A | 11/2011 |
| JP | 2013-539171 A | 10/2013 |
| JP | 2015-159116 A | 9/2015 |
| JP | 2015-534231 A | 11/2015 |

OTHER PUBLICATIONS

International Preliminary Report on Patentability dated Jun. 28, 2018 from the International Bureau in counterpart International Application No. PCT/JP2017/041846.

\* cited by examiner

POWER STORAGE MODULE

This application is a National Stage of International Application No. PCT/JP2017/041846 filed Nov. 21, 2017, claiming priority based on Japanese Patent Application No. 2016-246298 filed Dec. 20, 2016 and Japanese Patent Application No. 2017-025309 filed Feb. 14, 2017, the contents of all of which are incorporated herein by reference in their entirety.

TECHNICAL FIELD

The present invention relates to a power storage module.

BACKGROUND ART

As a secondary battery, a bipolar battery disclosed in Patent Document 1 is known. In the bipolar battery, bipolar electrodes each having a positive electrode on one face of a current and a negative electrode on the other face of the current collector are stacked alternately with electrolyte layers. A resin seal portion is provided between adjacent current collectors.

CITATION LIST

Patent Document

Patent Document 1: Japanese Patent Application Publication No. 2006-86049

SUMMARY OF INVENTION

Technical Problem

The electrolyte layers each include a separator that permits electrolytic solution to pass therethrough. Meanwhile, the separators are disposed between adjacent current collectors (electrode plates) to prevent short circuit between the current collectors. In a direction that crosses the stacking direction of the bipolar electrodes, a clearance may be present between the separator and the resin seal portion. If such a clearance is present, there is a fear that, when any of the electrode plates is deformed for some reason, a short circuit may occur between adjacent electrode plates through the clearance. Deformation of an electrode plate described above may occur during formation of the seal portion or when an internal pressure changes during the use of the battery.

The present invention is directed to providing a power storage module that prevents short circuit between adjacent electrode plates.

Means for Solving Problem

According to an aspect of the present invention, there is provided a power storage module that includes a plurality of bipolar electrodes each including an electrode plate, a positive electrode formed on a first face of the electrode plate, and a negative electrode formed on a second face of the electrode plate; and a plurality of separators with which the bipolar electrodes are stacked alternately. The power storage module includes a cylindrical resin portion that extends in a direction in which the bipolar electrodes are stacked and that accommodates therein the plurality of bipolar electrodes. The resin portion includes a first seal portion that has a cylindrical shape and is joined to peripheral edge portions of the electrode plates, and a second seal portion that has a cylindrical shape and is disposed outside the first seal portion in a direction that crosses the stacking direction of the bipolar electrodes. The separators are disposed such that outer peripheral ends of the separators are located between an outer peripheral end of the first seal portion and an inner peripheral end of the first seal portion.

According to the power storage module, the peripheral edge portions of the electrode plates may be sealed by the first seal portion. The outer peripheral surface of the first seal portion may be sealed by the second seal portion provided outside the first seal portion. Since the resin portion has a double sealing structure, any gas or electrolytic solution present in spaces between adjacent electrode plates is prevented from moving to the outside of the spaces. The separators are each disposed between the adjacent electrode plates. Since the outer peripheral ends of the separators are located between the outer peripheral end of the first seal portion and the inner peripheral end of the first seal portion, the separators are always situated in a region inside the inner peripheral end of the first seal portion. In other words, in the direction that crosses the stacking direction of the bipolar electrodes, the separators overlap with the first seal portion. Thus, the separators are always situated between the adjacent electrode plates. With this configuration, there is no region where the adjacent electrode plates directly face each other, so that short circuit between the electrode plates is prevented.

The first seal portion may include a plurality of frame bodies that is stacked in the stacking direction of the bipolar electrodes. Each of the frame bodies is contacted with the peripheral edge portion of the corresponding electrode plate and has a thickness that is greater than a thickness of the separators in the stacking direction of the bipolar electrodes. The frame bodies may each have a stepped portion in which the outer peripheral end of the corresponding separator is to be disposed. In this case, since the separators are disposed in the stepped portions of the frame bodies, it is easy to achieve the above-described structure in which the separators overlap with the first seal portion. Furthermore, the influence of the separators on the thickness of the frame bodies in the stacking direction has been reduced.

The frame bodies may each include an inner peripheral portion that is disposed on either one of the first face and the second face of the corresponding electrode plate and joined to the one of the first face and the second face on which the frame body is disposed, and an outer peripheral portion that is formed continuously from an outer side of the inner peripheral portion, and is contacted with one of the frame bodies that is adjacent in the stacking direction of the bipolar electrodes. The stepped portions are each formed between the inner peripheral portion and the outer peripheral portion of the corresponding frame body. In this case, since each frame body is joined to only one of the first face and the second face of the corresponding electrode plate, the processing cost for joining the frame body to the electrode plate (e.g., the cost for the surface treatment on the electrode plate) may be reduced. Furthermore, since the outer peripheral portion has a thickness in the stacking direction of the bipolar electrodes (i.e., the height), it is easy to form the stepped portion in which the separator is to be disposed.

The frame bodies each include a first frame body member that is disposed on the first face of the corresponding electrode plate and joined to the first face, and a second frame body member that is disposed on the second face of the corresponding electrode plate and joined to the second face. Either one of the first frame body member and the second frame body member of each of the frame bodies may have a stepped portion. In this case, because the electrode plate is sandwiched between the first frame body member and the second frame body member, the joining process of the first frame body member and the second frame body member to the electrode plate may be facilitated. The processing is easier when, for example, press-forming is used to press the electrode plate from both the first face side and the second face side thereof.

The frame body may include a first frame body member that is disposed on the first face of the electrode plate and joined to the first face, and a second frame body member that is disposed on the second face of the electrode plate and joined to the second face. The stepped portions may each be formed between the electrode plate and either one of the first frame body member and the second frame body member of the corresponding frame body. In this case, because the electrode plate is sandwiched between the first frame body member and the second frame body member, the joining process of the first frame body member and the second frame body member to the electrode plate may be facilitated. The processing is easier when, for example, press-forming is used to press the electrode plate from both the first face side and the second face side thereof.

According to another aspect of the present invention, there is provided a power storage module that includes a plurality of bipolar electrodes each including a positive electrode formed on a first face of the electrode, and a negative electrode formed on a second face of the electrode plate, and a plurality of separators with which the bipolar electrodes are stacked alternately. The power storage module includes a cylindrical resin portion that extends in the stacking direction of the plurality of bipolar electrodes and accommodates therein the plurality of bipolar electrodes. The resin portion includes a first seal portion that has a cylindrical shape and is joined to peripheral edge portions of the electrode plates, and a second seal portion that has a cylindrical shape and is disposed outside the first seal portion in a direction that crosses the stacking direction of the bipolar electrodes. The separators are disposed such that the outer peripheral ends of the separators are located at the same position as the outer peripheral end of the first seal portion or at a position inside the outer peripheral end of the separators and outside the inner peripheral end of the first seal portion.

According to the power storage module, the peripheral edge portions of the electrode plate may be sealed by the first seal portion. An outer peripheral surface of the first seal portion may be sealed by the second seal portion provided outside the first seal portion. Since the resin portion has a double sealing structure, any gas or electrolytic solution present in spaces between adjacent electrode plates is prevented from moving to the outside of the spaces. The separators are provided between adjacent electrode plates. Since the outer peripheral ends of the separators are located at a same position as the outer peripheral end of the first seal portion, or a position inside the outer peripheral ends of the separators and outside the inner peripheral end of the first seal portion, the separators are always situated in a region inside the inner peripheral end of the first seal portion. In other words, in the direction that crosses the stacking direction of the bipolar electrodes, the separators overlap with the first seal portion. Thus, the separators are always situated between the adjacent electrode plates. With this configuration, there is no region where the adjacent electrode plates directly face each other, so that short circuit between the electrode plates is prevented.

The first seal portion may include a plurality of frame bodies that is stacked in the stacking direction of the bipolar electrodes. Each of the frame bodies may be joined to the peripheral edge portion of the corresponding electrode plate. The separators may each have the peripheral edge portion that includes the outer peripheral end of each of the separators and is located outside the inner peripheral end of the first seal portion. At least a part of the peripheral edge portion of each of the separators may be located between the corresponding frame body and the peripheral edge portion of the corresponding electrode plate, and may be contacted with the peripheral edge portion of the electrode plate. In this case, since the separator is located between the frame body and the electrode plate and contacted with the electrode plate also in the region where the first seal portion is provided, short circuit between the electrode plates are reliably prevented.

At least a part of the peripheral edge portion of each of the separators may be joined to at least either one of the corresponding frame body and the peripheral edge portion of the corresponding electrode plate. In this case, the separator is held firmly by the primary seal portion.

The second seal portion may be joined to an outer peripheral surface of the first seal portion. Even in the case where a path through which gas etc. can pass is formed in the first seal portion, a further sealing is provided by the second seal portion, so that the air tightness and the liquid tightness are enhanced.

Advantageous Effects of Invention

According to the aspects of the present invention, short circuit between the adjacent electrode plates can be prevented.

DESCRIPTION OF EMBODIMENTS

Figure 1:
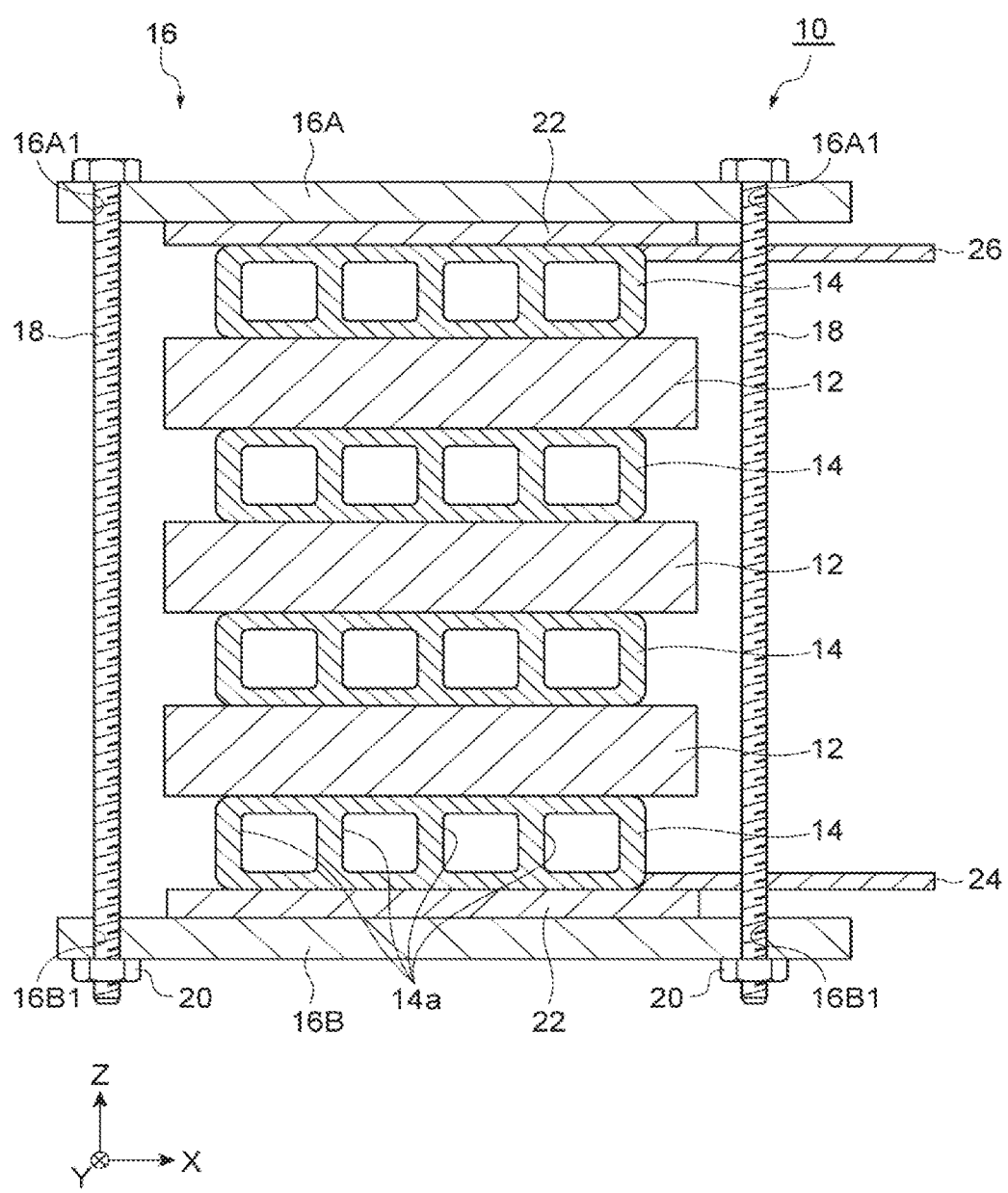
FIG. 1 is a schematic cross-sectional view of a power storage device that includes a power storage module according to an embodiment of the present invention.

The following will describe embodiments of the present invention with reference to the drawings. It is to be noted that the same reference numerals are allocated to the same elements, and their description will not be repeated. In each of the drawings, an XYZ orthogonal coordinate system is indicated.

A power storage device according to an embodiment will now be described with reference to FIG. 1. A power storage device 10 illustrated in FIG. 1 is used as a battery for vehicles, such as forklift trucks, hybrid vehicles, and electric vehicles. Although the power storage device 10 includes a plurality of power storage modules 12 (three power storage modules 12 in the present embodiment), the power storage device 10 may include only a single power storage module 12. The power storage modules 12 are bipolar batteries. The power storage modules 12 are secondary batteries, such as nickel-metal hydride secondary batteries, or lithium ion secondary batteries. However, electric double layered capacitors may be used as the power storage modules 12. In the following description, nickel-metal hydride batteries are exemplified.

The plurality of power storage modules 12 may be stacked with conductor plates 14, such as metal plates, interposed between the power storage modules 12. The power storage modules 12 and the conductor plates 14 each have a rectangular shape, for example, as viewed in a direction in which the power storage modules 12 and the conductor plates 14 are stacked. Details of the power storage modules 12 will be described later. The power storage modules 12 and the conductor plates 14 are stacked such that the conductor plates 14 are disposed outside opposite ends of the power storage modules 12 in the stacking direction of the power storage modules 12 (in the Z direction). The conductor plates 14 are electrically connected to the adjacent power storage modules 12. With this configuration, the plurality of power storage modules 12 is stacked serially in the stacking direction. The conductor plate 14 that is located at one end in the stacking direction is connected with a positive electrode terminal 24, and the conductor plate 14 that is located at the other end in the stacking direction is connected with a negative electrode terminal 26. The positive electrode terminal 24 and the conductor plate 14 that is connected with the positive electrode terminal 24 may be integrated. The negative electrode terminal 26 and the conductor plate 14 that is connected with the negative electrode terminal 26 may be integrated. The positive electrode terminal 24 and the negative electrode terminal 26 extend in a direction that crosses the stacking direction (in the X direction). The power storage device 10 is charged and discharged with the positive electrode terminal 24 and the negative electrode terminal 26.

The conductor plates 14 may function as heat dissipation plates that release heat generated in the power storage modules 12. A plurality of void portions 14a is provided within each of the conductor plates 14. Refrigerant, such as air, passes through the void portions 14a, so that heat from the power storage modules 12 can be released efficiently to the outside. Each void portion 14a extends, for example, in the direction that crosses the stacking direction (in the Y direction). Although the conductor plates 14 are smaller than the power storage modules 12 as viewed in the stacking direction, the conductor plates 14 may have the same size as the power storage modules 12 or otherwise may have a size that is larger than the power storage modules 12.

The power storage device 10 includes a binding member 16 for binding the power storage modules 12 and the conductor plates 14 that are alternately stacked in the stacking direction. The binding member 16 includes a pair of binding plates 16A and 16B, and connecting members (bolts 18 and nuts 20) for connecting the binding plates 16A and 16B together. An insulation film 22, such as a resin film, is disposed between the binding plate 16A and the conductor plate 14 and between the binding plate 16B and the conductor plate 14. Each of the binding plates 16A and 16B are formed of a metal, such as iron. The binding plates 16A and 16B and the insulation films 22 have a rectangular shape, for example, as viewed in the stacking direction. The insulation films 22 are formed to be larger than the conductor plates 14, and the binding plates 16A and 16B are formed to be larger than the power storage modules 12. Insertion holes 16A1 through which the shaft portions of the bolts 18 are passed are formed at positions in the edge portion of the binding plate 16A that are outside the power storage modules 12 as viewed in the stacking direction. Similarly, insertion holes 16B1 through which the shaft portions of the bolts 18 are passed are formed at positions in the edge portion of the binding plate 16B that are outside the power storage modules 12 as viewed in the stacking direction. In the case where the binding plates 16A and 16B have a rectangular shape as viewed in the stacking direction, then the insertion holes 16A1 and the insertion holes 16B1 are located at the corners of the binding plates 16A and 16B.

The binding plate 16A at one end is contacted to the conductor plate 14 that is connected with the negative electrode terminal 26 via the insulation film 22, and the binding plate 16B at the other end is contacted to the conductor plate 14 that is connected with the positive electrode terminal 24 via the insulation film 22. The bolts 18 are inserted into the insertion holes 16A1 and 16B1 from the binding plate 16A side at the one end toward the binding plate 16B at the other end, for example. A nut 20 is tightened on the leading end of each bolt 18 extending out from the binding plate 16B at the other end. Thus, the insulation films 22, the conductor plates 14, and the power storage modules 12 are sandwiched to form a single unit, and at the same time a binding load is applied in the stacking direction.

Figure 2:
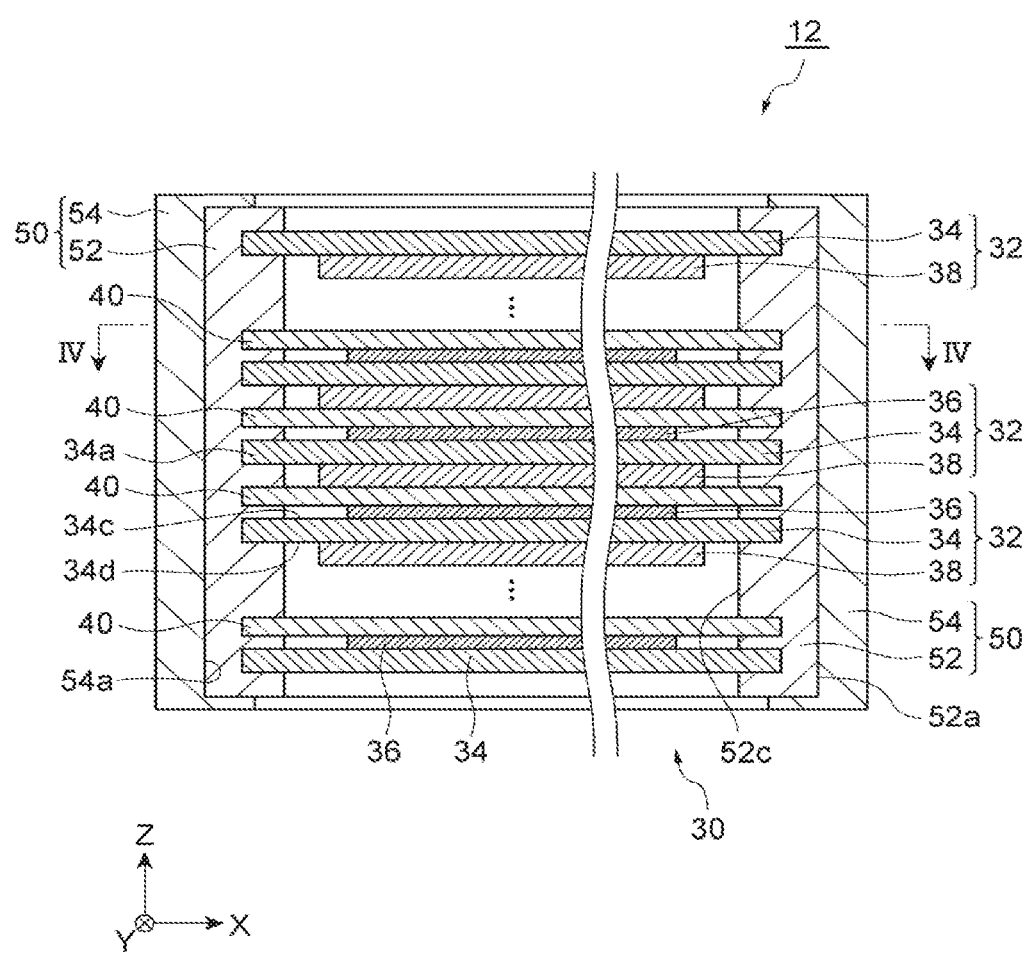
FIG. 2 is a schematic cross-sectional view of a power storage module that constitutes the power storage device of FIG. 1.

The power storage modules that constitute the power storage device will now be described with reference to FIG. 2. The power storage module 12 illustrated in FIG. 2 includes a stack body 30 that is formed by stacking a plurality of bipolar electrodes 32. The stack body 30 has a rectangular shape, for example, as viewed in the stacking direction of the bipolar electrodes 32. Separators 40 may be disposed between adjacent bipolar electrodes 32.

Each bipolar electrode 32 includes an electrode plate 34, a positive electrode 36 disposed on a first face 34c of the electrode plate 34, and a negative electrode 38 disposed on a second face 34d of the electrode plate 34. In the stack body 30, the positive electrode 36 of a first bipolar electrode 32 faces the negative electrode 38 of one of the bipolar electrodes 32 that are adjacent in the stacking direction through the separator 40, and the negative electrode 38 of the first bipolar electrode 32 faces the positive electrode 36 of the other of the adjacent bipolar electrodes 32 in the stacking direction through the separator 40.

The electrode plate 34 that is disposed at one end of the stack body 30 in the stacking direction has the negative electrode 38 on an inner face of the electrode plate 34 (the lower face of the electrode plate 34 in the drawing). The electrode plate 34 corresponds to the terminal electrode on the negative electrode side. The electrode plate 34 that is disposed at the other end of the stack body 30 in the stacking direction has the positive electrode 36 on an inner face of the electrode plate 34 (the upper face of the electrode plate 34 in the drawing). The electrode plate 34 corresponds to the terminal electrode on the positive electrode side. The negative electrode 38 of the terminal electrode on the negative electrode side faces the positive electrode 36 of the bipolar electrode 32 located as the top layer of the stack body 30 through the separator 40. The positive electrode 36 of the terminal electrode on the positive electrode side faces the negative electrode 38 of the bipolar electrode 32 that is located as the bottom layer of the stack body 30 through the separator 40. Each of the electrode plates 34 as the terminal electrodes is connected with the adjacent conductor plate 14 (see FIG. 1).

The power storage module 12 extends in the stacking direction of the bipolar electrodes 32, and includes a cylindrical resin portion 50 in which the stack body 30 is accommodated. The resin portion 50 holds the peripheral edge portion 34a of each of the electrode plates 34. The resin portion 50 is configured to surround the stack body 30. The resin portion 50 has a rectangular shape, for example, as viewed in the stacking direction of the bipolar electrodes 32. In other words, the resin portion 50 has a square cylindrical shape, for example.

The resin portion 50 is joined to the peripheral edge portions 34a of the electrode plates 34, and includes a first seal portion 52 that holds the peripheral edge portions 34a, and a second seal portion 54 that is disposed outside the first seal portion 52 in a direction that crosses the stacking direction (in the X direction and the Y direction).

The first seal portion 52 that forms an inner wall of the resin portion 50 is disposed so that the first seal portion 52 surrounds the entire periphery of the peripheral edge portions 34a of the electrode plates 34 in the plurality of bipolar electrodes 32 (i.e., the stack body 30). The first seal portion 52 is welded, for example, to the peripheral edge portions 34a of the electrode plates 34, so that the first seal portion 52 seals the peripheral edge portions 34a. In other words, the first seal portion 52 is joined to the peripheral edge portions 34a of the electrode plates 34. In each bipolar electrode 32, the peripheral edge portion 34a of the electrode plate 34 is embedded in and held by the first seal portion 52. The peripheral edge portions 34a of the electrode plates 34 that are located at the opposite ends of the stack body 30 are also embedded in and held by the first seal portion 52. With this configuration, an airtight internal space is formed between two adjacent electrode plates 34 and 34 that are adjacent to each other in the stacking direction. The internal space is defined by the two electrode plates 34, 34 and the first seal portion 52. The internal space is filled with an electrolytic solution (not shown) made of alkaline solution, such as potassium hydroxide solution.

The second seal portion 54 constituting an outer wall of the resin portion 50 covers an outer peripheral surface 52a of the first seal portion 52 that extends in the stacking direction of the bipolar electrodes 32. An inner peripheral surface 54a of the second seal portion 54 is, for example, welded onto the outer peripheral surface 52a of the first seal portion 52 to seal the outer peripheral surface 52a. Specifically, the second seal portion 54 is joined to the outer peripheral surface 52a of the first seal portion 52. The weld face (the joining face) of the second seal portion 54 to be welded to the first seal portion 52 forms, for example, four rectangular planes.

The electrode plates 34 are rectangular metallic foils that are made of nickel or the like. In each electrode plate 34, the peripheral edge portion 34a is provided as an uncoated area where positive active material and negative active material are not applied. That is, in the uncoated area, the electrode plate 34 is exposed. The uncoated area is embedded in and held by the first seal portion 52 that constitutes the inner wall of the resin portion 50. Examples of the positive active material constituting the positive electrode 36 include nickel hydroxide. Examples of the negative active material constituting the negative electrode 38 include hydrogen absorbing alloy. In each electrode plate 34, an area in the second face 34d where the negative electrode 38 is formed may be slightly greater than an area in the first face 34c where the positive electrode 36 is formed.

The separators 40 are formed in sheets, for example. Each separator 40 has a rectangular shape, for example. Examples of the materials that constitute the separators 40 include a porous film made of polyolefin resin, such as polyethylene (PE), polypropylene (PP): and a woven fabric or a non-woven fabric made of polypropylene or the like. The separators 40 may also be reinforced by, for example, a vinylidene fluoride resin compound or the like. It is to be noted that the type of the separators 40 is not limited to the sheets, and may be the envelope type.

The resin portion 50 (the first seal portion 52 and the second seal portion 54) that is made of insulating resin, for example, and formed into a rectangular cylindrical shape by injection molding. Examples of resin materials forming the resin portion 50 include polypropylene (PP), polyphenylene sulfide (PPS), and modified polyphenylene ether (modified PPE).

Figure 3A:
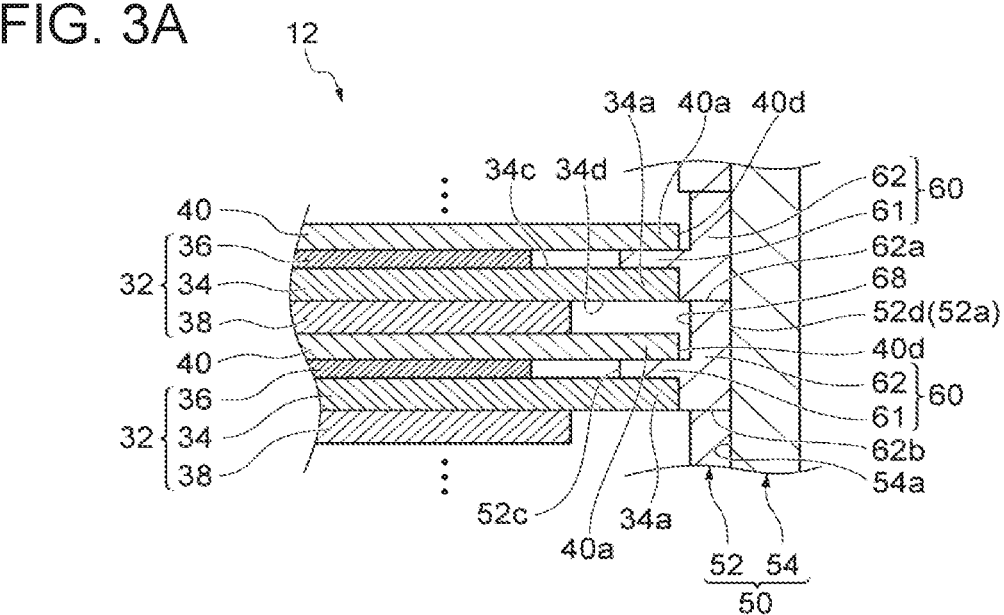
FIG. 3A is a cross-sectional view showing a structure around a resin portion according to a first embodiment of the present invention.

The structures of the resin portion 50, the bipolar electrodes 32, and the separators 40 according to the first embodiment will now be described with reference to FIGS. 3A, 3B, and 4. As illustrated in FIGS. 3A and 4, the peripheral edge portion 40a of each of the separators 40 overlaps with the area where the first seal portion 52 is provided, as viewed in the stacking direction. Specifically, when the separator 40 and the first seal portion 52 are projected in the stacking direction onto a plane (the X-Y plane) that is perpendicular to the stacking direction, the projected images are superimposed (the images overlap with each other). The separator 40 extends to the area where the first seal portion 52 is provided. The outer peripheral end 40d of the separator 40 is located between the outer peripheral end 52d of the first seal portion 52 and the inner peripheral end 52c of the first seal portion 52. It is to be noted that in FIG. 4, the illustration of the separator 40 is partially broken for the ease of understanding the configuration of the first seal portion 52.

One separator 40 is disposed between two adjacent electrode plates 34 also in the region around the first seal portions 52 of the adjacent electrode plates 34, so that the uncoated areas of the adjacent electrode plates 34 do not directly face each other. One separator 40 is always present between the uncoated area of one of the two adjacent electrode plates 34 and the uncoated area of the other of the two adjacent electrode plates 34. The separators 40 are disposed so as to overlap with the first seal portion 52, so that the two adjacent electrode plates 34 (especially the uncoated areas) do not contact each other and therefore occurrence of a short circuit is prevented. The whole periphery of the outer peripheral end 40d of the separator 40 may be located between the outer peripheral end 52d of the first seal portion 52 and the inner peripheral end 52c of the first seal portion 52. In a part of each separator 40 in the peripheral direction thereof, the outer peripheral end 40d may be located between the outer peripheral end 52d of the first seal portion 52 and the inner peripheral end 52c of the first seal portion 52. In the peripheral direction of each separator 40, as the area of each separator 40 overlapping with the first seal portion 52 is greater, prevention of short circuit may be more reliable.

Figure 3B:
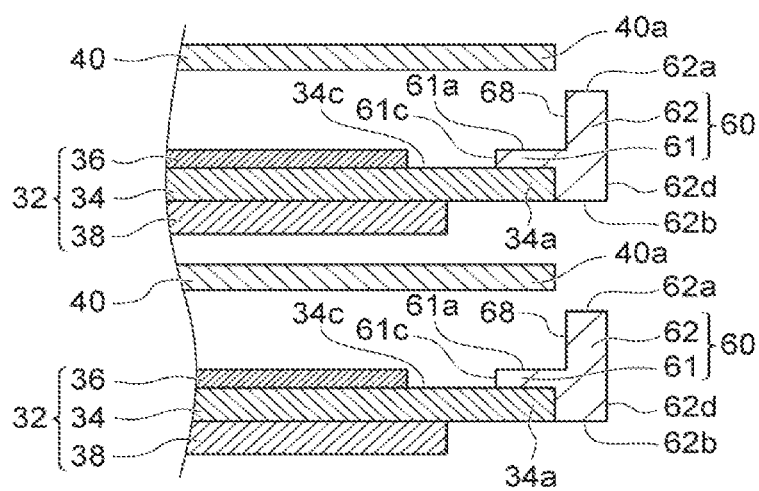
FIG. 3B is a cross-sectional view showing a state before bipolar batteries are stacked according to the first embodiment.
Figure 4:
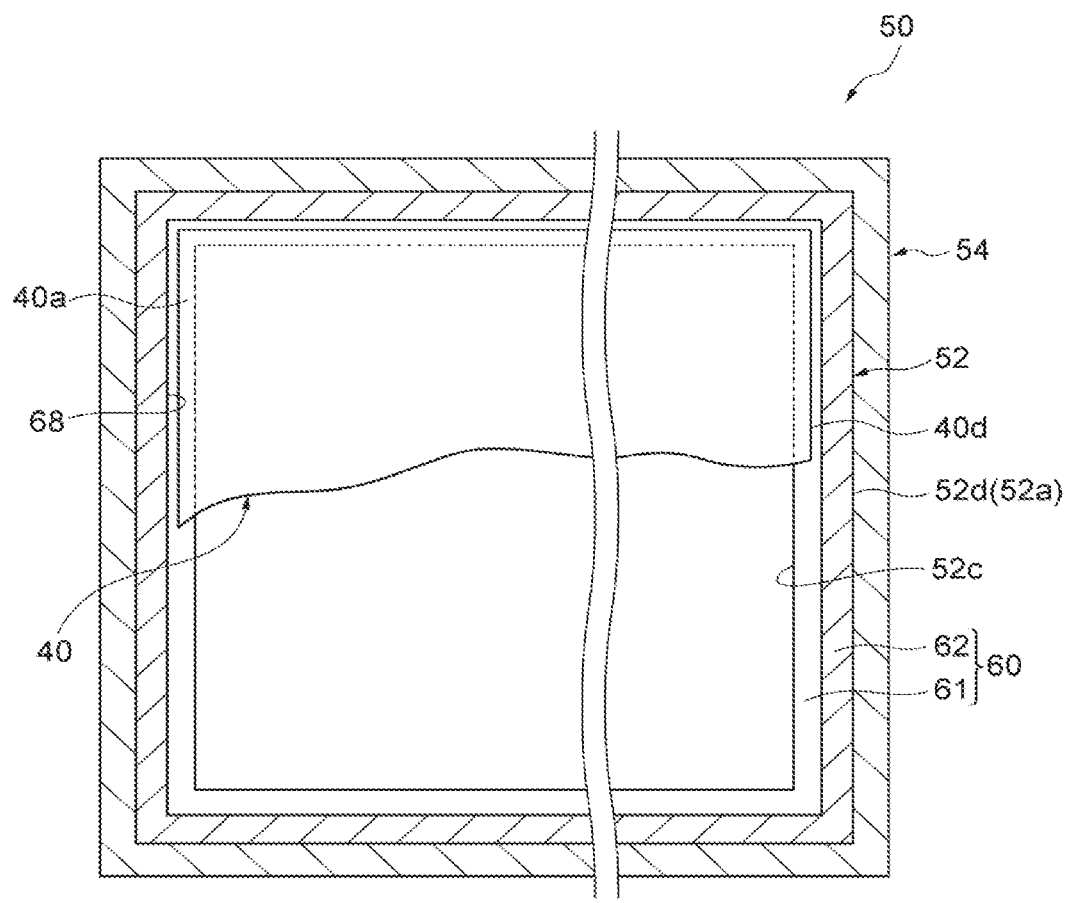
FIG. 4 is a cross-sectional view taken along line IV-IV of FIG. 2 and corresponding to the first embodiment illustrated in FIG. 3A.

The above-described configuration is described further in detail with reference to FIGS. 3A and 3B. The first seal portion 52 is configured by stacking a plurality of frame bodies 60 in the stacking direction. Each frame body 60 has a thickness in the stacking direction that is greater than that of each separator 40. More specifically, each frame body 60 has a thickness in the stacking direction that is greater than a sum of the thickness of one electrode plate 34 and the thickness of one separator 40. Each frame body 60 is contacted with the peripheral edge portion 34a of the electrode plate 34 and with its adjacent frame bodies 60 that are adjacent in the stacking direction. One frame body 60 and the other frame body 60 contacting with each other define the height of an internal space formed between two adjacent electrode plates 34 and 34 that are adjacent in the stacking direction. In other words, the frame bodies 60 define the height of a cell of the power storage module 12.

It is to be noted that the "thickness" of the separator 40 herein refers to the thickness of a separator 40 in a power storage module 12. The thickness of a separator 40 in a power storage module 12 may be smaller than the thickness of the separator 40 before the power storage module 12 is assembled. Specifically, the separator 40 is sandwiched between the positive electrode 36 and the negative electrode 38 and thus may be compressed. The "thickness" of the separator 40 herein refers to the thickness of the compressed separator 40.

Each frame body 60 includes an inner peripheral portion 61 that is formed on the first face 34c side of the electrode plate 34 and is contacted to the first face 34c, and an outer peripheral portion 62 that is formed continuously from the outer side of the inner peripheral portion 61. The inner peripheral portion 61 and the outer peripheral portion 62 are each formed conforming to the shape of the electrode plate 34, and have a rectangular shape, for example. The inner peripheral portion 61 is welded, for example, to the first face 34c of the electrode plate 34. Specifically, the inner peripheral portion 61 is joined to the first face 34c of the electrode plate 34. The inner peripheral end 61c of the inner peripheral portion 61 (see FIG. 3B) corresponds to the inner peripheral end 52c of the first seal portion 52. The thickness of the outer peripheral portion 62 is greater than the thickness of the inner peripheral portion 61, and corresponds to the thickness of the frame body 60. The outer peripheral surface 62d of the outer peripheral portion 62 corresponds to the outer peripheral end 52d of the first seal portion 52 (i.e., the outer peripheral surface 52a). In the stacking direction, the first end face 62a of the outer peripheral portion 62 is contacted with the second end face 62b of its adjacent outer peripheral portion 62.

The inner peripheral portion 61 and the outer peripheral portion 62 of each frame body 60 that have different thicknesses in the stacking direction cooperate to form a stepped portion 68 which has a shape of rectangular ring and connects the inner peripheral portion 61 and the outer peripheral portion 62. The height of the stepped portion 68 in the stacking direction is greater than the thickness of the separator 40. A peripheral edge portion 40a that includes the outer peripheral end 40d of the separator 40 is disposed in the stepped portion 68. Specifically, the stepped portion 68 formed with the frame body 60 faces inward of the frame body 60 to provide a space for disposing the outer peripheral end 40d of the separator 40 in the first seal portion 52. For example, the peripheral edge portion 40a of the separator 40 is contacted with the surface 61a of the inner peripheral portion 61 (see FIG. 3B; the face of the inner peripheral portion 61 opposite from the face that is joined to the first face 34c). The separator 40 is set within the height of the frame body 60. A small clearance may be formed between the peripheral edge portion 40a and the electrode plate 34 that is adjacent to the separator 40 at a distance corresponding to the thickness of the negative electrode 38.

As described above, in each power storage module 12, the separator 40 may be compressed in the stacking direction at the area thereof where the positive electrode 36 and the negative electrode 38 are provided. Meanwhile, the area of the separator 40 that faces the uncoated area and the area of the separator 40 that is disposed inside the first seal portion 52 do not receive the pressing force in the stacking direction. Therefore, such areas of the separator 40 are not compressed in the stacking direction. In other words, the area of the separator 40 facing the uncoated area and the area of the separator 40 located within the first seal portion 52 have a play in the stacking direction (the separator 40 can move freely). With this configuration, the compression of the separator 40 may be minimized and the compression reaction force of the separator 40 may be minimized. As a result, the binding force of the binding member 16 may be reduced. Furthermore, the void portion of the separator 40 is not collapsed unintentionally, so that the internal space may be increased. As a result, an increase of the internal pressure may be prevented.

It is to be noted that the magnitude relationship between the size of the separators 40 and the size of the electrode plates 34 may be any magnitude relationship as long as the peripheral edge portions 40a of the separators 40 are located within the width of the first seal portion 52 in the direction that crosses the stacking direction (the X-direction and the Y-direction). The separators 40 may be larger than the electrode plates 34 and also may be smaller than the electrode plates 34 as viewed in the stacking direction. The separators 40 may have a size that is substantially equal to the size of the electrode plates 34 as viewed in the stacking direction.

A method of manufacturing the power storage modules 12 will next be described. First, the positive electrode 36 is formed on the first face 34c of each electrode plate 34, and the negative electrode 38 is formed on the second face 34d of the electrode plate 34 to obtain one bipolar electrode 32. Next, the frame body 60 is joined to the peripheral edge portion 34a of the electrode plate 34 of the bipolar electrode 32. For the joining, the frame body 60 may be welded to the peripheral edge portion 34a by hot pressing the upper and lower faces of the bipolar electrode 32. Subsequently, a plurality of bipolar electrodes 32 each joined with the frame body 60 is stacked with the separators 40 interposed therebetween to obtain one stack body 30 (see FIG. 3B).

It is to be noted that when the frame body 60 is welded to the peripheral edge portion 34a by hot pressing, the frame body 60 may be formed using a hot pressing die. For example, the surface 61a, the first end face 62a, and the stepped portion 68 of the frame body 60 may be formed using a hot pressing die. The hot pressing die may be made of resin, for example. The hot pressing die may be made of fluororesin containing PTFE (polytetrafluoroethylene), and PFA (tetrafluoroethylene-perfluoroalkyl vinyl ether copolymer). In this case, entry of foreign matters into the frame body 60 may be prevented.

Next, the second seal portion 54 is formed, for example, by injection molding (see FIG. 3A). For example, a resin material of the second seal portion 54 having fluidity is poured into a mold to form the second seal portion 54.

In the present embodiment, the first seal portion 52 as a part of the resin portion 50 is formed prior to the stacking process, and the second seal portion 54 that is the remainder part of the resin portion 50 is formed after the stacking process. However, the first seal portion 52 as a part of the resin portion 50 may be formed after the stacking process.

Subsequently, an electrolytic solution is injected into the resin portion 50 through an injection port or the like. The injection port is sealed after the injection of the electrolytic solution, so that the power storage module 12 is manufactured. Then, the plurality of power storage modules 12 is stacked alternately with the conductor plates 14, as illustrated in FIG. 1. The conductor plates 14 that are located at the opposite ends in the stacking direction are connected with the positive electrode terminal 24 and the negative electrode terminal 26, respectively, beforehand. Subsequently, the pair of binding plates 16A and 16B is located at the opposite ends in the stacking direction via the insulation films 22, and then the binding plates 16A and 16B are connected together with the bolts 18 and the nuts 20. In this way, the power storage device 10 illustrated in FIG. 1 is manufactured.

In the power storage modules 12 according to the above first embodiment, the peripheral edge portions 34a of the electrode plates 34 may be sealed by the first seal portion 52. The outer peripheral surface 52a of the first seal portion 52 may be sealed by the second seal portion 54 provided outside the first seal portion 52. Since the resin portion 50 has a double sealing structure, any gas and electrolytic solution present in spaces between adjacent electrode plates 34 cannot move to the outside of the spaces. The separators 40 are provided between adjacent electrode plates 34. Since the outer peripheral ends 40d of the separators 40 are located between the outer peripheral end 52d of the first seal portion 52 and the inner peripheral end 52c of the first seal portion 52, the separators 40 are situated in a region that is located inside the inner peripheral end 52c the first seal portion 52. In other words, in the direction that crosses the stacking direction, the separators 40 overlap with the first seal portion 52. Therefore, the separators 40 are situated between adjacent electrode plates 34. With this configuration, there is no region where the electrode plates 34 directly face their adjacent electrode plates 34, so that short circuit between the electrode plates 34 is prevented even when any of the electrode plates 34 is deformed. Deformation of the electrode plates 34 may occur during the formation of the first seal portion 52 or when an internal pressure changes during the use of the power storage device 10. In any case, with the positional relationship between the separator 40 and the first seal portion 52, short circuit between the electrode plates 34 may be prevented.

Figure 7:
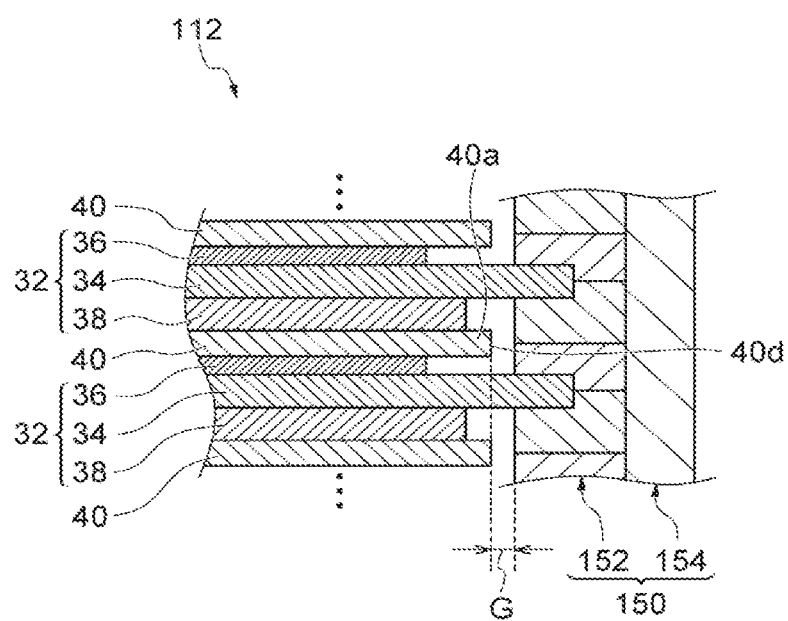
FIG. 7 is a cross-sectional view showing a structure around a resin portion according to a reference embodiment of the present invention.

In a power storage module 112 according to a reference embodiment illustrated in FIG. 7, a clearance G may be present between the separators 40 and the resin portion 150 in the direction that crosses the stacking direction. Specifically, the clearance G may be present between the first seal portion 152 of the resin portion 150 that includes the first seal portion 152 and the second seal portion 154 and the outer peripheral ends 40d of the separators 40. There has been a fear that when any of the electrode plates 34 is deformed for some reason, a short circuit may occur between adjacent electrode plates 34 through the clearance G. In contrast to this, the power storage module 12 according to the present embodiment reliably prevents short circuit between the electrode plates 34.

Since the separators 40 are disposed in the stepped portions 68 of the frame bodies 60 constituting the resin portion 50, the above-described configuration in which the separators 40 overlap with the first seal portion 52 may be achieved easily. Furthermore, the influence of the separator 40 on the thickness of the frame body 60 in the stacking direction has been reduced.

In the case of the frame bodies 60 that are provided at only one side of the electrode plates 34, the frame bodies 60 are joined only to the first faces 34c of the electrode plates 34. Therefore, the cost for joining the frame bodies 60 to the electrode plates 34 (e.g., the cost for surface treatment on the electrode plates 34) may be reduced. Furthermore, since the outer peripheral portion 62 of each frame body 60 has a thickness in the stacking direction (i.e., the height), it is easy to form the stepped portion 68 in which the separator 40 is disposed.

Figure 5A:
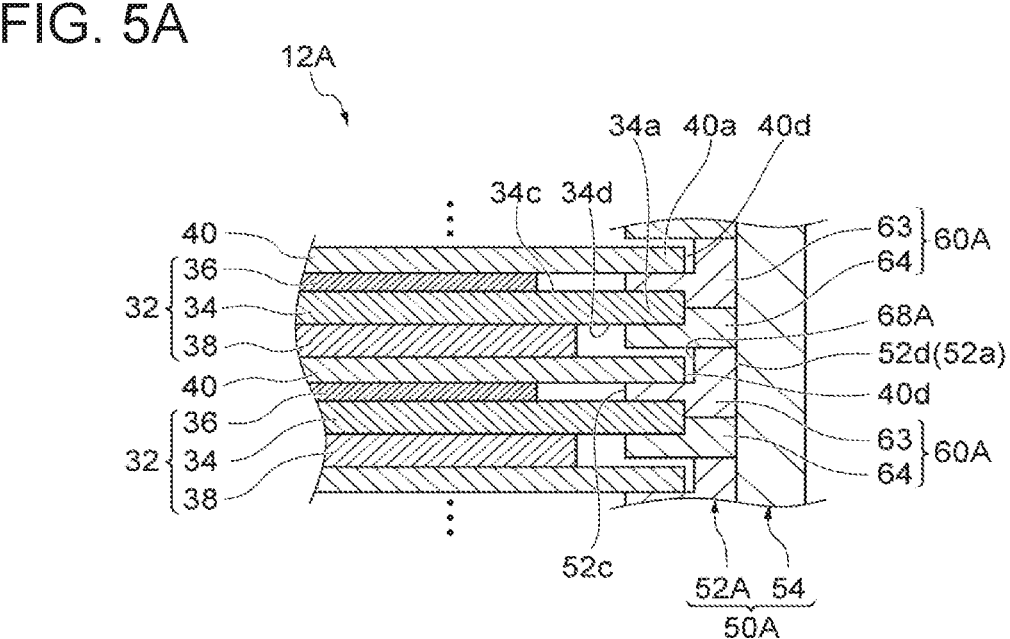
FIG. 5A is a cross-sectional view showing a structure around a resin portion according to a second embodiment of the present invention.
Figure 5B:
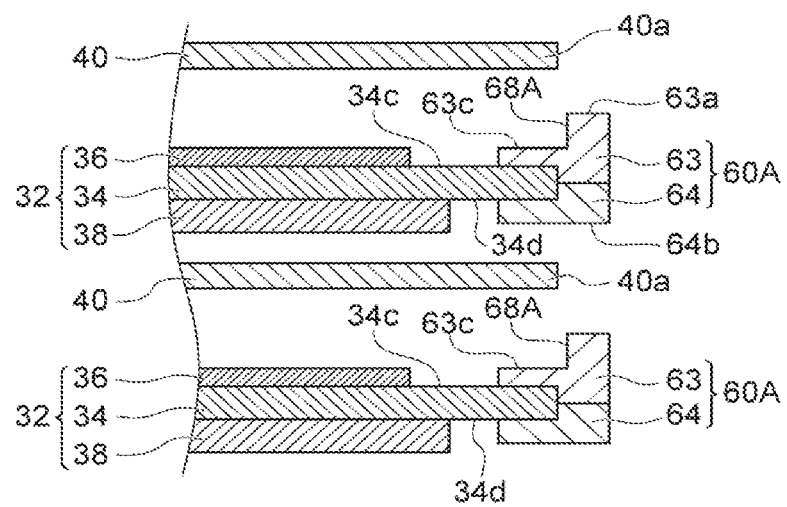
FIG. 5B is a cross-sectional view showing a state before bipolar batteries are stacked according to the second embodiment.

The structures of the resin portion 50A, the bipolar electrodes 32, and the separators 40 according to a second embodiment will now be described with reference to FIGS. 5A and 5B. Power storage modules 12A according to the second embodiment are different from the power storage modules 12 according to the first embodiment in that each power storage module 12A includes frame bodies 60A instead of the frame bodies 60, and each frame body 60A includes a first frame body member 63 disposed on the first face 34c side of the electrode plate 34, and a second frame body member 64 disposed on the second face 34d side of the electrode plate 34. A first seal portion 52A has a structure in which a plurality of the frame bodies 60A is stacked in the stacking direction. The first frame body member 63 is welded (joined) to the first face 34c of the electrode plate 34. The second frame body member 64 is welded (joined) to the second face 34d of the electrode plate 34. The first frame body member 63 and the second frame body member 64 each have a portion that extends outward of the peripheral edge portion 34a of the electrode plate 34, and the extending portions are welded to each other. In the stacking direction, the first end face 63a of the first frame body member 63 is contacted with the second end face 64b of the second frame body member 64 of its adjacent frame body 60A. The frame bodies 60A define the height of each internal space formed between the electrode plates 34, 34 that are adjacent in the stacking direction.

The first frame body members 63 have substantially the same configuration as that of the frame bodies 60 of the first embodiment. Each first frame body member 63 has a stepped portion 68A. The peripheral edge portion 40a of each separator 40 including the outer peripheral end 40d thereof is disposed in the stepped portion 68A. Specifically, each stepped portion 68A formed on the first frame body member 63 faces inward of the frame body 60A to provide a space that permits the disposition of the outer peripheral end 40*d* of the separator 40 inside the first seal portion 52A. The outer peripheral ends 40*d* of the separators 40 are located between the outer peripheral end 52*d* and the inner peripheral end 52*c* of the first seal portion 52A. The peripheral edge portion 40*a* of each separator 40, for example, is contacted with a surface 63*c* of the first frame body member 63. Each separator 40 is set within the height of the frame body 60A. A small clearance may be formed between the peripheral edge portion 40*a* and the adjacent second frame body member 64 that is adjacent to the separator 40.

As is the case of the power storage modules 12, the power storage modules 12A prevent short circuit between the electrode plates 34. In addition, each electrode plate 34 is sandwiched between the first frame body member 63 and the second frame body member 64, so that the joining process of the first frame body member 63 and the second frame body member 64 to the electrode plate 34 may be performed easily. The joining processing is easier, for example, if press-forming is used and the first frame body member 63 and the second frame body member 64 are pressed from both the first face 34*c* side and the second face 34*d* side of the electrode plate 34.

Figure 6A:
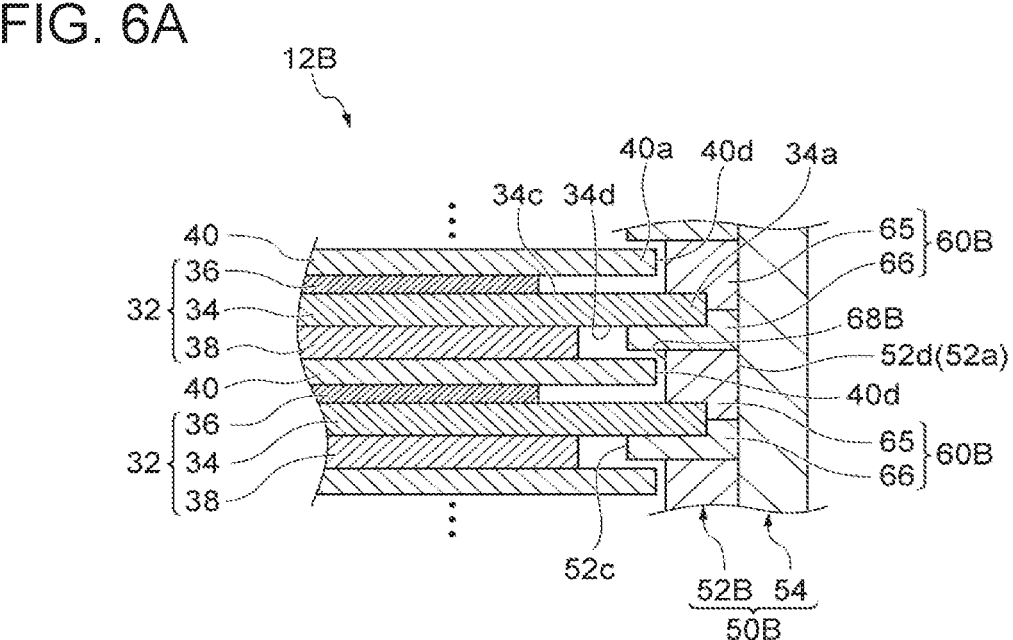
FIG. 6A is a cross-sectional view showing a structure around a resin portion according to a third embodiment of the present invention.
Figure 6B:
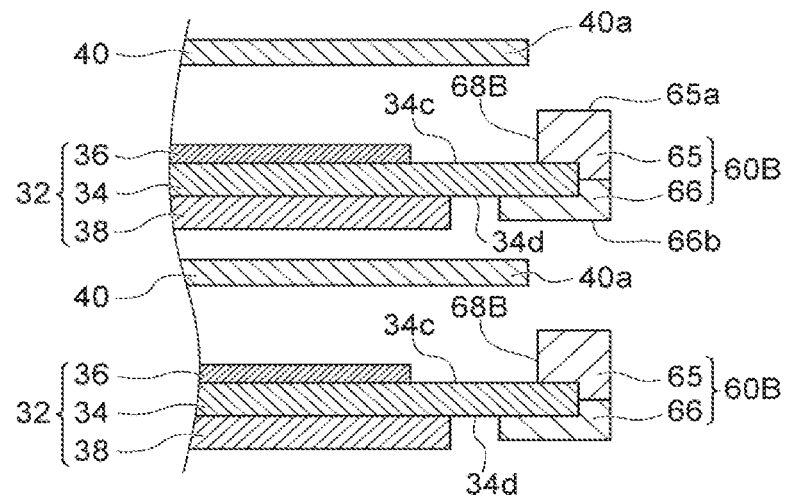
FIG. 6B is a cross-sectional view showing a state before bipolar batteries are stacked according to the third embodiment.

The structures of a resin portion 50B, the bipolar electrodes 32, and the separators 40 according to a third embodiment of the present invention will now be described with reference to FIGS. 6A and 6B. Power storage modules 12B according to the third embodiment are different from the power storage modules 12 according to the first embodiment in that each power storage module 12B includes frame bodies 60B instead of the frame body 60, and each frame body 60B includes a first frame body member 65 disposed on the first face 34*c* side of the electrode plate 34 and a second frame body member 66 that is disposed on the second face 34*d* side of the electrode plate 34. A first seal portion 52B is configured by stacking a plurality of frame bodies 60B in the stacking direction. The first frame body member 65 is welded (joined) to the first face 34*c* of the electrode plate 34. The second frame body member 66 is welded (joined) to the second face 34*d* of the electrode plate 34. The first frame body member 65 and the second frame body member 66 each have a portion that extends outward of the peripheral edge portion 34*a* of the electrode plate 34, and the extending portions are welded to each other. In the stacking direction, a first end face 65*a* of the first frame body member 65 is contacted with the second end face 66*b* of the second frame body member 66 of its adjacent frame body 60B. The frame bodies 60B define the height of each internal space formed between the electrode plates 34, 34 that are adjacent in the stacking direction.

Each frame body 60B has a stepped portion 68B formed between the first frame body member 65 and the electrode plate 34. Specifically, the stepped portion 68B is an inner peripheral end of the first frame body member 65 and connects the first end face 65*a* and the first face 34*c* of the electrode plate 34. The first frame body member 65 and the second frame body member 66 may have different sizes in the direction that crosses the stacking direction (the X-direction and the Y-direction). The second frame body member 66 may be larger than the first frame body member 65. Specifically, an inner peripheral end of the second frame body member 66 may be located inside the inner peripheral end of the first frame body member 65 (i.e., the stepped portion 68B). The peripheral edge portion 40*a* of each separator 40 including the outer peripheral end 40*d* thereof is disposed in the stepped portion 68B. Specifically, each stepped portion 68B that is formed in the frame body 60B faces inward of the frame body 60B to provide a space that permits the disposition of the outer peripheral end 40*d* of the separator 40 inside the first seal portion 52B. The outer peripheral ends 40*d* of the separators 40 are located between the outer peripheral end 52*d* and the inner peripheral end 52*c* of the first seal portion 52B. Each separator 40 is set within the height of the frame body 60B. Small clearances may be formed between the peripheral edge portion 40*a* and the electrode plate 34 that is adjacent to the separator 40 and the second frame body member 66.

As is the case of the power storage modules 12, the power storage modules 12B prevent short circuit between the electrode plates 34. In addition, each electrode plate 34 is sandwiched between the first frame body member 65 and the second frame body member 66, so that the joining process of the first frame body member 65 and the second frame body member 66 to the electrode plate 34 may be performed easily. The joining processing is easier, for example, if press-forming is used and the first frame body member 65 and the second frame body member 66 are pressed from both the first face 34*c* side and the second face 34*d* side of the electrode plate 34. Furthermore, the resin portion 50B (the first seal portion 52B) may be provided with a core member.

Figure 8:
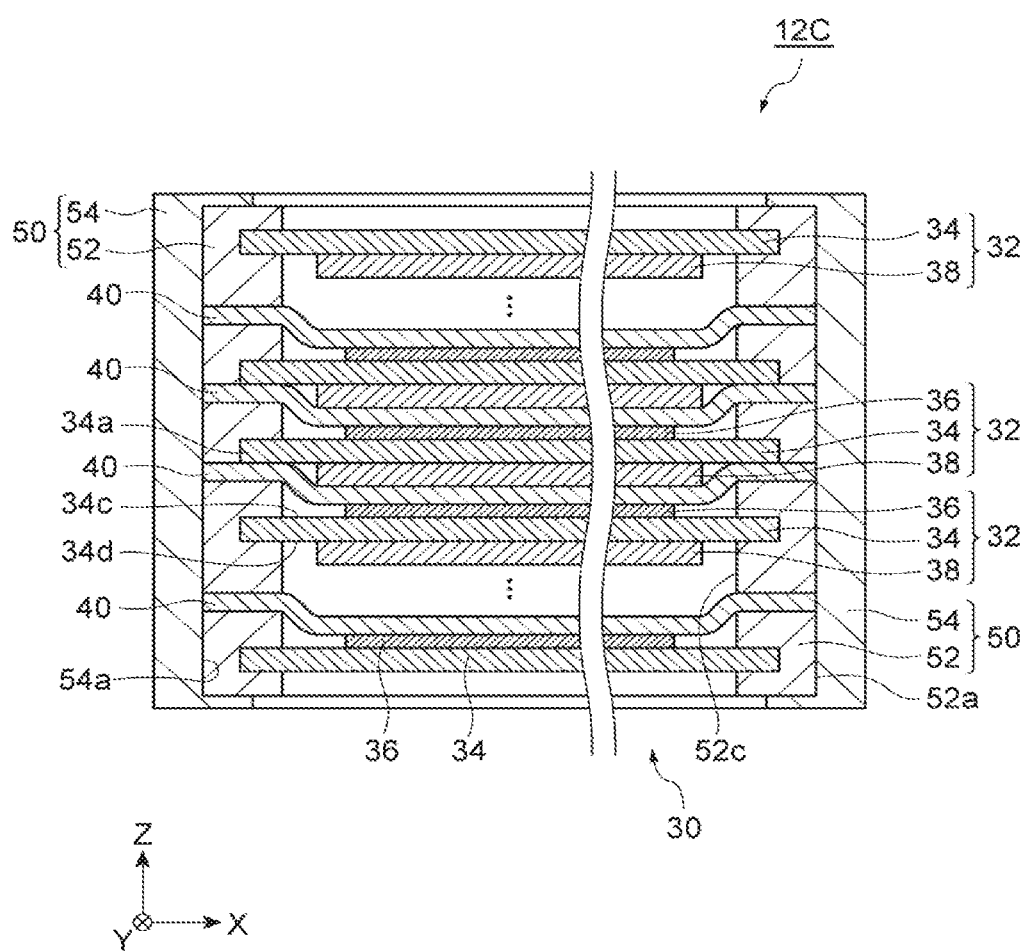
FIG. 8 is a schematic cross-sectional view of a power storage module according to another embodiment of the present invention.

The structures of a resin portion 50C, the bipolar electrodes 32, and the separators 40 according to a fourth embodiment of the present invention will now be described with reference to FIGS. 8, 9A, and 9B. Power storage modules 12C according to the fourth embodiment each include a first seal portion 52C that is configured by stacking a plurality of frame bodies 70 in the stacking direction. The power storage modules 12C according to the fourth embodiment are different from the power storage modules 12, 12A, and 12B according to the first to third embodiment in that each frame body 70 does not have a stepped portion that permits the disposition the outer peripheral end 40*d* of the separator 40.

Figure 9A:
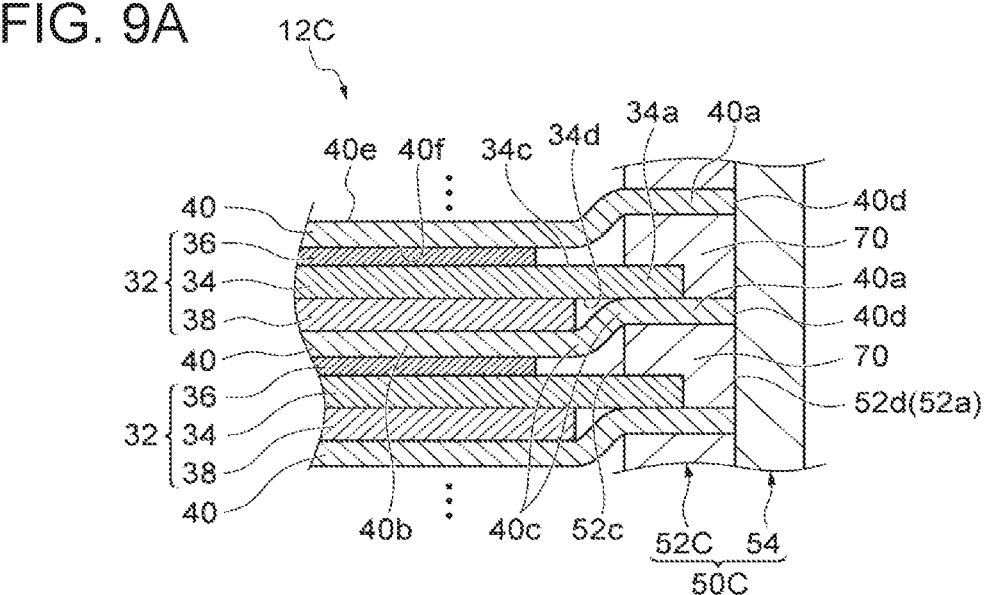
FIG. 9A is a cross-sectional view showing a structure around a resin portion according to a fourth embodiment of the present invention.
Figure 9B:
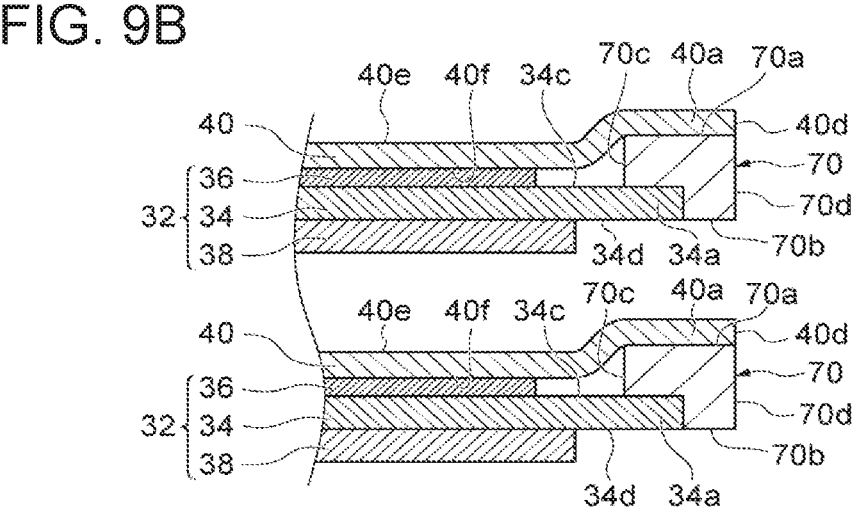
FIG. 9B is a cross-sectional view showing a state before bipolar batteries are stacked according to the fourth embodiment.

As illustrated in FIG. 9B, each frame body 70 is disposed only on the first face 34*c* side of each electrode plate 34, for example. The positive electrode 36 is disposed on the first face 34*c* of each electrode plate 34. The first faces 34*c* of the electrode plates 34 may be surface treated so as to enhance the joining property of the positive electrodes 36 to the electrode plates 34. The frame bodies 70 are joined easily to the first faces 34*c* with a surface treatment. The peripheral edge portion 40*a* of each separator 40 is disposed on a first end face 70*a* of the frame body 70. More specifically, a part of the peripheral edge portion 40*a* of the separator 40 on a second face 40*f* side is contacted with the first end face 70*a* of the frame body 70. Since each frame body 70 is formed so that the first end face 70*a* extends in the stacking direction beyond the positive electrode 36 of the bipolar electrode 32, the separator 40 has a bent shape. As illustrated in FIG. 9A, each separator 40 includes a flat electrode contacting portion 40*b* that is contacted with the bipolar electrode 32, and two bending portions 40*c* formed between the peripheral edge portion 40*a* and the electrode contacting portion 40*b*. The separator 40 is contacted with the positive electrode 36 at the second face 40*f* of the electrode contacting portion 40*b*. The part of the separator 40 between the two bending portions 40*c* is inclined relative to a plane that is perpendicular to the stacking direction (the X-Y plane).

As illustrated in FIGS. 9A and 9B, the outer peripheral ends 40*d* of the separators 40 may be flush with the outer peripheral surfaces 70*d* of the frame bodies 70. The inner peripheral surfaces 70*c* of the frame bodies 70 correspond to the inner peripheral ends 52c of the first seal portions 52C. The outer peripheral surfaces 70d of the frame bodies 70 correspond to the outer peripheral ends 52d (i.e., the outer peripheral surface 52a) of the first seal portion 52C. The outer peripheral ends 40d of the separators 40 are located at the same position as the outer peripheral end 52d of the first seal portion 52C, or at a position inside the outer peripheral end 52d and outside the inner peripheral end 52c of the first seal portion 52C.

In the method of manufacturing the power storage modules 12C, for example, one bipolar electrode 32, one frame body 70, and one separator 40 may be integrated as an assembly, as illustrated in FIG. 9B. The structures (assemblies) each including the bipolar electrode 32, the frame body 70, and the separator 40 may be stacked in the stacking direction. Each outer peripheral surface 70d is welded to the peripheral edge portion 34a by hot pressing from the upper and lower faces of the bipolar electrode 32. The hot pressing may be carried out with the separator 40 set. In such case, a part of the peripheral edge portion 40a of the separator 40 on the second face 40f side is welded (joined) to the first end face 70a of the frame body 70. The entire peripheral edge portion 40a may be welded to the frame body 70, or only a part of the peripheral edge portion 40a may be welded to the frame body 70.

It is preferable that the separators 40 be joined to either one of the frame bodies 70 and the peripheral edge portions 34a of the electrode plates 34. The separators 40 may also be joined to both of the frame bodies 70 and the peripheral edge portions 34a of the electrode plates 34. The separators 40 may be attached after the joining process of the frame bodies 70 by the hot pressing. The separators 40 may be joined to at least either the frame bodies 70 or the peripheral edge portions 34a of the electrode plates 34 by bonding or the like.

As illustrated in FIG. 9A, in a state where the structures (assemblies) each including one bipolar electrode 32, one frame body 70, and one separator 40 are stacked in the stacking direction, the peripheral edge portion 40a of each separator 40 is interposed between the frame body 70 and the peripheral edge portion 34a of its adjacent electrode plate 34 that is adjacent in the stacking direction and another frame body 70. More specifically, a part of the peripheral edge portion 40a of each separator 40 on the first face 40e side is contacted with the part of the peripheral edge portion 34a of the electrode plate 34 on the second face 34d side, which electrode plate 34 is adjacent to the separator 40 in the stacking direction, and with the second end face 70b of the another frame body 70 (see FIG. 9B). The separator 40 may be joined to the peripheral edge portion 34a of its adjacent electrode plate 34 that is adjacent in the stacking direction and/or another frame body 70.

In this way, the whole separator 40 is melted, and the frame body 70 is attached to the melted separator 40, so that the separator 40 is held more reliably by the first seal portion 52C. As a result, short circuit between the electrode plates 34 may be prevented more reliably. That is, the separator 40 prevents a self-charging which is caused by a contact between the positive electrode 36 and the negative electrode 38.

According to the power storage modules 12C of the above fourth embodiment, the peripheral edge portions 34a of the electrode plates 34 may be sealed by the first seal portion 52C. The outer peripheral surface 52a of the first seal portion 52C may be sealed by the second seal portion 54 provided outside the first seal portion 52C. With the double sealing structure of the resin portion 50C, any gas and electrolytic solution present in the spaces between adjacent electrode plates 34 cannot move to the outside of the spaces. The separators 40 are disposed between adjacent electrode plates 34. Since the outer peripheral ends 40d of the separators 40 may be located at the same position as the outer peripheral end 52d of the first seal portion 52C, or at a position inside the outer peripheral end 52d and outside the inner peripheral end 52c of the first seal portion 52C, the separators 40 are always situated in a region that is located inside the inner peripheral end 52c of the first seal portion 52C. Specifically, in a direction that crosses the stacking direction, the separators 40 overlaps with the first seal portion 52C. Thus, the separators 40 are always present between adjacent electrode plates 34. This configuration eliminates any region where adjacent electrode plates 34 directly face each other, so that short circuit between the electrode plates 34 may be prevented even when any of the electrode plates 34 is deformed.

At least a part of the peripheral edge portion of each separator 40 is interposed between the frame body 70 and the peripheral edge portion 34a of the electrode plate 34 and contacted with the peripheral edge portion 34a of the electrode plate 34. In this case, since the separator 40 is interposed between the frame body 70 and the electrode plate 34 and contacted with the electrode plate 34 also in the region in which the first seal portion 52C is provided, short circuit between the electrode plates 34 may be further reliably prevented.

The second seal portion 54 is joined to the outer peripheral surface 52a of the first seal portion 52C. Even in the case where a path through which gas, etc. can pass is formed in the first seal portion 52C, further sealing is made by the second seal portion 54, so that the air tightness and the liquid tightness are enhanced.

Figure 10A:
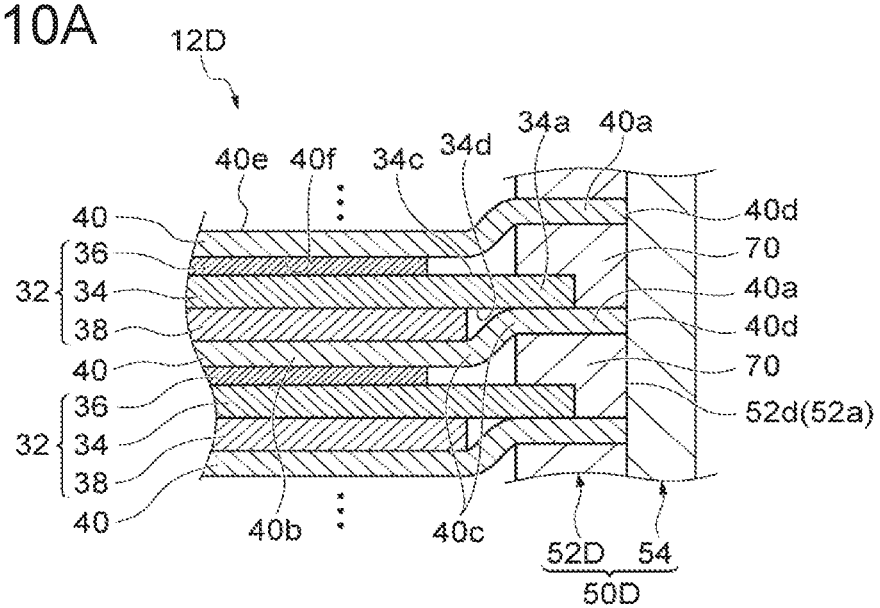
FIG. 10A is a cross-sectional view showing a structure around a resin portion according to a fifth embodiment of the present invention.
Figure 10B:
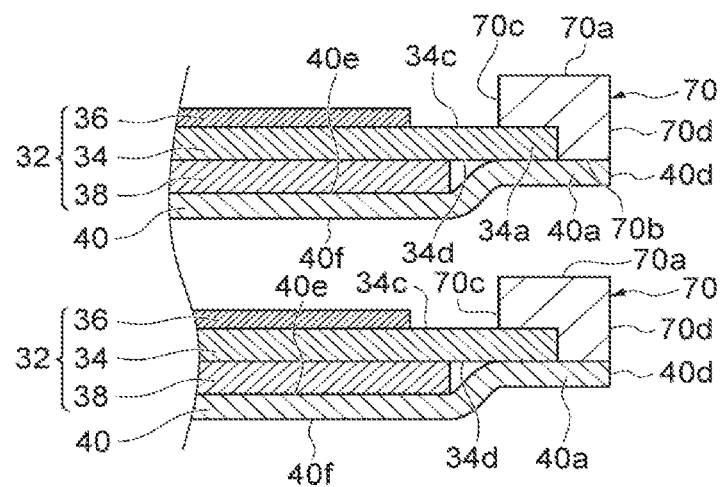
FIG. 10B is a cross-sectional view showing a state before bipolar batteries are stacked according to the fifth embodiment.

The structures of the resin portion 50D, the bipolar electrodes 32, and the separators 40 according to a fifth embodiment will now be described with reference to FIGS. 10A and 10B. Power storage modules 12D according to the fifth embodiment are different from the power storage modules 12C according to the fourth embodiment in that in each structure (each assembly) including a bipolar electrode 32, a frame body 70, and a separator 40, the separator 40 is attached on the second face 34d side of the electrode plate 34. The first seal portion 52D is configured by stacking a plurality of frame bodies 70 in the stacking direction. A part of the peripheral edge portion 40a of the separator 40 on the first face 40e side is contacted with a part of the peripheral edge portion 34a of the electrode plate 34 on the second face 34d side and the second end face 70b of the frame body 70. In the method of manufacturing the power storage modules 12D, the hot pressing may be carried out after with the separators 40 set. The separators 40 may be attached after the joining process of the frame bodies 70 by the hot pressing. The separators 40 may be joined to the peripheral edge portions 34a of the electrode plates 34 and/or the frame bodies 70. The stacked structure of the power storage module 12D illustrated in FIG. 10A is similar to the stacked structure of the power storage module 12C illustrated in FIG. 9A. As is the case of the power storage modules 12C, the power storage modules 12D prevent short circuit between the electrode plates 34.

Figure 11A:
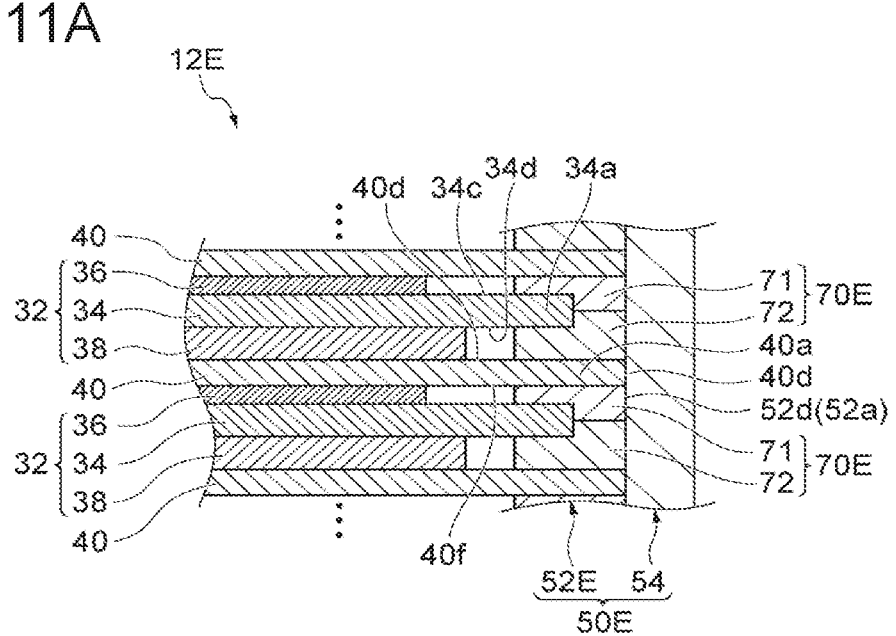
FIG. 11A is a cross-sectional view showing a structure around a resin portion according to a sixth embodiment of the present invention.
Figure 11B:
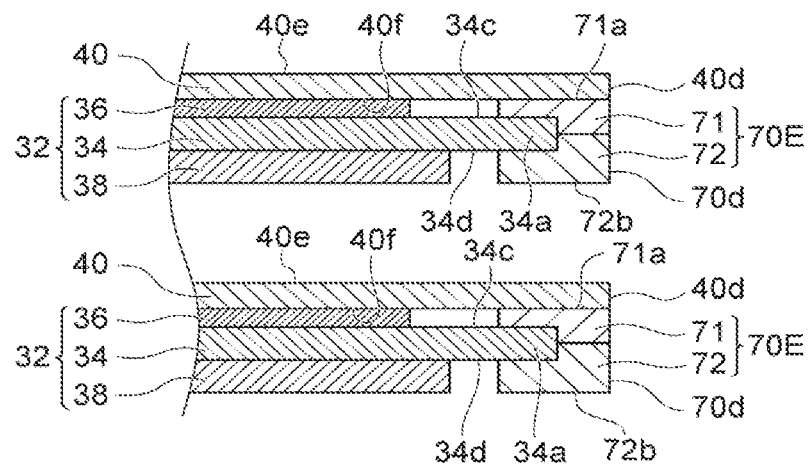
FIG. 11B is a cross-sectional view showing a state before bipolar batteries are stacked according to the sixth embodiment.

The structures of a resin portion 50E, the bipolar electrodes 32, and the separators 40 according to a sixth embodiment will now be described with reference to FIGS. 11A and 11B. Power storage modules 12E according to the sixth embodiment are different from the power storage modules 12C according to the fourth embodiment in that each power storage module 12E according to the sixth embodiment includes frame bodies 70E instead of the frame bodies 70, and each frame body 70E includes a first frame body member 71 disposed on the first face 34c side of the electrode plate 34, and a second frame body member 72 disposed on the second face 34d side of the electrode plate 34. The first seal portion 52E is configured by stacking a plurality of frame bodies 70E in the stacking direction. A part of the peripheral edge portion 40a of each separator 40 on the second face 40f side is contacted with the first end face 71a of the first frame body member 71, a part of the peripheral edge portion 40a of the separator 40 on the first face 40e side is contacted with the second end face 72b of its adjacent second frame body member 72 that is adjacent in the stacking direction. The separator 40 is entirely flat and may not have a bending portion. In the method of manufacturing the power storage modules 12E, the hot pressing may be carried out with the separators 40 set. The separators 40 may be attached after the joining process of the frame bodies 70 by the hot pressing. Each separator 40 may be joined to the first end face 71a of the first frame body member 71 during the joining process of the frame body 70. Each separator 40 may be joined to the second frame body member 72 of its adjacent frame body 70. As is the case of the power storage modules 12C, the power storage modules 12E prevent short circuit between electrode plates 34.

Although the embodiments of the present invention have been described above, the present invention is not limited to the above embodiments. For example, in the first embodiment, the inner peripheral portions 61 may be disposed on the second faces 34d side of the electrode plates 34 and contacted with the second faces 34d. In the second embodiment, each second frame body member 64 may have a stepped portion. In the third embodiment, each frame body 60A may have a stepped portion formed between the second frame body member 66 and the electrode plate 34.

In the above first to third embodiments, the stepped portions 68, 68A, and 68B may not be provided.

In the above fourth to sixth embodiments, the separators 40 may be joined neither to the frame bodies 70 nor to the peripheral edge portions 34a of the electrode plates 34. The separators 40 that are simply sandwiched still can offer the above-described effect of preventing short circuit.

In the above fourth to sixth embodiments, the outer peripheral ends of the electrode plates 34 may be flush with the outer peripheral surfaces 70d of the frame bodies 70 and 70E. In such case, although the outer peripheral ends of the electrode plates 34 are exposed to the outer peripheral surface 52a of the first seal portion, the second seal portion 54 may be joined to the outer peripheral ends of the electrode plates 34. The outer peripheral ends of the electrode plates 34 may be located at any appropriate position in the first seal portion. The outer peripheral ends of the electrode plates 34 and the outer peripheral ends 40d of the separators 40 may be located at the same position in the direction perpendicular to the stacking direction (the X-Y direction). In such case, since the electrode plates 34 and the separators 40 will have the same size, it is easy to stack the electrode plates 34 and the separators 40.

In each of the structures (assemblies) that includes one bipolar electrode, one frame body, and one separator, the separator may be interposed between the electrode plate and the frame body.

DESCRIPTION OF REFERENCE NUMERALS 12, 12A, 12B, 12C, 12D, 12E Power storage module
32 Bipolar electrode
34 Electrode plate
34a Peripheral edge portion
34c first face
34d second face
36 Positive electrode
38 Negative electrode
40 Separator
40d Outer peripheral end
50, 50A, 50B, 50C, 50D, 50E Resin portion
52, 52A, 52B, 52C, 52D, 52E First seal portion
52a Outer peripheral surface
52c Inner peripheral end
52d Outer peripheral end
54 Second seal portion
60, 60A, 60B Frame body
61 Inner peripheral portion
62 Outer peripheral portion
63 First frame body member
64 Second frame body member
65 First frame body member
66 Second frame body member
68, 68A, 68B Stepped portion
70, 70E Frame body
71 First frame body member
72 Second frame body member

The invention claimed is:

1. A power storage module comprising:
a plurality of bipolar electrodes each including an electrode plate, a positive electrode formed on a first face of the electrode plate, and a negative electrode formed on a second face of the electrode plate; and
a plurality of separators with which the bipolar electrodes are stacked alternately, wherein
the power storage module includes a cylindrical resin portion that extends in a direction in which the plurality of bipolar electrodes are stacked and that accommodates therein the plurality of bipolar electrodes,
the resin portion includes a first seal portion that has a cylindrical shape and is joined to peripheral edge portions of the electrode plates, and a second seal portion that has a cylindrical shape, is disposed outside the first seal portion in a direction that crosses the stacking direction of the bipolar electrodes so that an outer peripheral surface of the first seal portion is sealed by the second seal portion,
the separators are disposed such that outer peripheral ends of the separators are located between an outer peripheral end of the first seal portion and an inner peripheral end of the first seal portion,
the first seal portion includes a plurality of frame bodies stacked in the stacking direction, the frame bodies each have a step formed between an inner peripheral portion of the frame bodies and an outer peripheral portion of the frame bodies,
each of the separators includes a peripheral edge portion disposed in the step of the frame bodies so that the peripheral edge portion of each of the separators contacts the inner peripheral portion of the frame bodies, and a clearance is provided in the stacking direction between the peripheral edge portion of the separators that contacts the inner peripheral portion of the frame bodies and the electrode plate of the adjacent bipolar electrodes.

2. The power storage module according to claim 1, wherein
each of the frame bodies contacts the peripheral edge portion of the corresponding electrode plate and has a thickness that is greater than a thickness of the corresponding separator in the stacking direction of the bipolar electrodes.

3. The power storage module according to claim 1, wherein
the inner peripheral portion of each of the frame bodies is disposed on either one of the first face and the second face of the corresponding electrode plate, and joined to the one of the first face and the second face on which the frame body is disposed, and
the outer peripheral portion of each of the frame bodies is formed continuously from an outer side of the inner peripheral portion, and is contacted with one of the frame bodies that is adjacent in the stacking direction of the bipolar electrodes.

4. The power storage module according to claim 1, wherein
the frame bodies each include:
a first frame body member that is disposed on the first face of the corresponding electrode plate and joined to the first face; and
a second frame body member that is disposed on the second face of the corresponding electrode plate and joined to the second face, and
either one of the first frame body member and the second frame body member of each of the frame bodies has the step.

5. The power storage module according to claim 1, wherein
the frame bodies each include:
a first frame body member that is disposed on the first face of the corresponding electrode plate and joined to the first face; and
a second frame body member that is disposed on the second face of the corresponding electrode plate and joined to the second face, and
the step that is formed between the corresponding electrode plate and either one of the first frame body member and the second frame body member of the corresponding frame body.

6. A power storage device comprising:
the power storage module according to claim 1, wherein the power storage module is a plurality of power storage modules, and the power storage modules are stacked serially in the stacking direction,
conductor plates alternately stacked with the power storage modules, and
a binding member, wherein the binding member includes a pair of binding plates and connecting members that connect the binding plates together, and
each one of the pair of binding plates is located at opposing outer ends, in the stacking direction, of the power storage modules and the conductor plates that are alternately stacked, so that the binding member binds together the power storage modules and the conductor plates in the stacking direction.

7. A power storage module comprising:
a plurality of bipolar electrodes each including an electrode plate, a positive electrode formed on a first face of the electrode plate, and a negative electrode formed on a second face of the electrode plate;
a plurality of separators with which the bipolar electrodes are stacked alternately; and
a cylindrical resin portion that extends in a direction in which the plurality of bipolar electrodes are stacked and that accommodates therein the plurality of bipolar electrodes, wherein
the resin portion includes a first seal portion that has a cylindrical shape and is joined to peripheral edge portions of the electrode plates, and a second seal portion that has a cylindrical shape, is disposed outside the first seal portion in a direction that crosses the stacking direction of the bipolar electrodes so that an outer peripheral surface of the first seal portion is sealed by the second seal portion,
the separators are disposed such that outer peripheral ends of the separators are located between an outer peripheral end of the first seal portion and an inner peripheral end of the first seal portion,
the first seal portion includes a plurality of frame bodies stacked in the stacking direction, the plurality of frame bodies each have a step formed between an inner peripheral portion of the frame bodies and an outer peripheral portion of the plurality of frame bodies,
the outer peripheral end of the separator is disposed in the step of the plurality of frame bodies,
the separator includes a first face that contacts a first surface of a first frame body of the plurality of frame bodies,
the separator includes a second face that is opposite from the first face of the separator in the stacking direction, and
the second face of the separator faces a second surface of a second frame body of the plurality of frame bodies, and a clearance is provided in the stacking direction between the second face of the separator and the second surface of the second frame body.

* * * * *